US012789720B2

(12) United States Patent
Pineda Sanchez

(10) Patent No.: US 12,789,720 B2
(45) Date of Patent: Nov. 10, 2026

(54) AUTOMOTIVE TRIM RETAINING SYSTEM WITH DIVIDED HOUSING

(71) Applicant: GM GLOBAL TECHNOLOGY OPERATIONS LLC, Detroit, MI (US)

(72) Inventor: Ricardo Pineda Sanchez, Zinacantepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 317 days.

(21) Appl. No.: 18/601,616

(22) Filed: Mar. 11, 2024

(65) Prior Publication Data

US 2025/0282308 A1 Sep. 11, 2025

(51) Int. Cl.
*B60R 13/02* (2006.01)

(52) U.S. Cl.
CPC ................................ *B60R 13/0206* (2013.01)

(58) Field of Classification Search
CPC ............ B60R 13/0206; B60R 13/0243; B60R 2013/0293; F16B 21/071; F16B 21/076; F16B 5/0657; B60J 5/0469
USPC ........ 296/39.1, 1.08, 146.7; 52/716.7, 716.5, 52/716.6
See application file for complete search history.

(56) References Cited

U.S. PATENT DOCUMENTS 7,954,205 B2 * 6/2011 Xueyong ................ F16B 5/128 24/297
10,017,130 B2 * 7/2018 Knieper ................ F16B 5/0657
2006/0197356 A1 * 9/2006 Catron ................ B60R 13/0243 296/146.7
2012/0001446 A1 * 1/2012 Vollet ...................... B60R 13/04 296/1.08
2014/0284962 A1 * 9/2014 Mally ................. B60R 13/0243 296/146.7
2015/0113773 A1 * 4/2015 Iwahara ................ F16B 5/0664 24/594.11
2016/0280106 A1 9/2016 Sato et al.
2018/0087553 A1 * 3/2018 Dobbs ................... F16B 5/0657

FOREIGN PATENT DOCUMENTS

FR 3114361 A1 * 3/2022 ............ F16B 5/0657
JP 2000071766 A * 3/2000
JP 2005081881 A 3/2005

OTHER PUBLICATIONS

Iwasaki (JP 2000071766 A) (Year: 2000).*
Lefevre et al. (FR 3114361 A1) (Year: 2022).*

* cited by examiner

*Primary Examiner* — Wenwei Zhuo
(74) *Attorney, Agent, or Firm* — Ingrassia Fisher & Lorenz, LLP | IFL

(57) ABSTRACT

A retaining system for automotive trim includes a component that has a hole, another component that has a housing, and a retainer that engages with the housing and with the hole. The housing includes a receiver having a cap defining an opening and the housing defines an entry. The opening is configured to receive the retainer when the retainer is inserted through the entry. A clip or clips is/are disposed at the entry and is/are configured to flex to allow insertion of the retainer through the entry. The housing is divided by a gap that is defined between the clip(s) and the cap.

20 Claims, 10 Drawing Sheets

AUTOMOTIVE TRIM RETAINING SYSTEM WITH DIVIDED HOUSING

INTRODUCTION

The present disclosure generally relates to connecting one component to another and more particularly relates to systems with mating retainers and housings, where the housing has a balance of strength and ergonomically beneficial compliance.

In manufactured articles, many approaches may be taken to connect one component to another. Generally, some type of fastening, bonding, fusion, and/or coupling is used. The approach selected is determined by the available access, surface quality considerations, strength requirements, ergonomic considerations, and other criteria. For example, components may be screwed, bolted, welded, glued, nailed, stapled, riveted, or otherwise fitted and secured together.

Automotive door trim panels serve as an interface with the vehicle's interior and exist between the interior and the sheet metal structure of, and inner mechanisms of, the door. The interior facing side may be referred to as an A-surface and has an aesthetic requirements, while the structure facing side may be referred to as the B-surface, which is generally not visible in the completed product. The door trim panels typically consist of a substrate covered with trim material. These door panels are connected with the door's structure by releasable retainers. The retainers are separate components that connect with a housing of the trim panel and then connect with the door structure, often with some type of snap-in fit that is completed in a blind fashion behind the B-surface. The system is preferably strong enough to resist all the forces that it may experience during the operation of the vehicle door and also ergonomical by allowing an ease insertion and extraction of the retainer.

Accordingly, it is desirable to provide mating components with a retainer system that is strong and ergonomic for use in various applications. Furthermore, other desirable features and characteristics of the present invention will become apparent from the subsequent detailed description and the appended claims, taken in conjunction with the accompanying drawings and the foregoing introduction.

SUMMARY

A retaining system such as for automotive trim includes, in a number of embodiments, a component that has a hole, another component that has a housing, and a retainer that engages with the housing and with the hole. The housing includes a receiver having a cap defining an opening and the housing defines an entry. The opening is configured to receive the retainer when the retainer is inserted through the entry. A clip or clips is/are disposed at the entry and is/are configured to flex to allow insertion of the retainer through the entry. The housing is divided by a gap that is defined between the clip(s) and the cap.

In additional embodiments, the housing includes a receiver disposed at a distance from a surface of the second component and connected to the surface of the second component by a wall. The receiver operates to receive and hold the retainer.

In additional embodiments, the clip is one of a pair of clips, where the pair of clips define the entry. The opening has a diameter and the entry has a width. The diameter is larger than the width when the pair of clips are in a relaxed state.

In additional embodiments, the clip is one of a pair of clips. The pair of clips define the entry. The opening has a diameter, and the entry has a width, and the diameter is larger than the width when the pair of clips are in a relaxed state.

In additional embodiments, the retainer includes a shaft, a head and a flange. The housing includes a platform, with supports extending from the platform toward the cap. The receiver defines a slot between the cap and the platform. The slot operates to receive the head and the opening operates to receive the shaft.

In additional embodiments, the housing includes a platform, with supports extending from the platform toward the cap, and a plurality of ribs are formed on the cap for strength.

In additional embodiments, the housing includes a platform, and the clip includes a tab that operates to flex the clip when a force is applied to the tab toward the platform.

In additional embodiments, the housing includes a platform. The clip includes a tab that operates to flex the clip when a force is applied to the tab toward the platform. A stop extends from the platform toward the tab. The stop operates to limit flexure of the clip to an amount within an elastic range.

In additional embodiments, the housing is produced within a form that has a pair of die elements that part at the gap. The section is disposed at the gap and operates to leave a membrane on the housing at the gap.

In additional embodiments, the clip operates to flex between a relaxed state and a flexed state. The housing operates to receive the retainer when the clip is in the flexed state and operates to hold the retainer in the housing when the clip is in the relaxed state.

In a number of additional embodiments, one component has a hole, and a housing is included on another component. A retainer operates to engage with the housing of the other component and with the one component at the hole. The housing includes a receiver that has a cap defining an opening and the housing defines an entry. The opening operates to receive the retainer when the retainer is inserted through the entry. A pair of clips is disposed at the entry. The clips define the entry and operate to flex to allow insertion of the retainer through the entry. The housing is divided by a gap that is defined between the clips and the cap.

In additional embodiments, the housing includes a receiver disposed at a distance from a surface of the second component and the receiver is connected to the surface of the second component by a wall. The receiver operates to receive and to releasably hold the retainer.

In additional embodiments, the clips define the entry. The opening has a diameter that is substantially the same in size as a shaft of the retainer. The entry has a width, and the diameter is larger than the width, when the clips are in a relaxed state.

In additional embodiments, the opening has a diameter, and the entry has a width between the clips. The diameter is larger than the width, when the first clip and the second clip are in a relaxed state.

In additional embodiments, the retainer includes a shaft, a head and a flange. The housing includes a platform, with supports extending from the platform toward the cap. The receiver defines a slot between the cap and the platform. The slot operates to receive the head, and the opening operates to receive the shaft. The supports operate to guide the head through the slot and to assist in flexing of the first and second clips.

In additional embodiments, the housing includes a platform, with supports extending from the platform toward the cap. The supports operate to support the retainer, and a plurality of ribs are formed on the cap for strength.

In additional embodiments, the housing includes a platform, and the clips include cantilevered legs. The clips each include a tab extending opposite the respective cantilevered leg. The tabs operate to effect flexing of the clips when forces are applied to the tabs toward the platform.

In additional embodiments, the housing includes a platform. The clips each include a tab configured to flex the respective clip when a force is applied to the respective tab toward the platform. A stop extends from the platform toward each of the first and second tabs. The stops operate to limit flexure of the clips to an amount within an elastic range.

In additional embodiments, the housing is produced within a form that has a pair of die elements that part at the gap. The section is disposed at the gap and operates to leave a membrane on the housing at the gap.

In a number of other embodiments, a retention system for a trim component of a vehicle includes a base component that has a hole. The base component is a panel of the vehicle. A housing is defined on the trim component. A retainer operates to engage with the housing of the trim component and with the base component at the hole. The housing includes a receiver that has a cap defining an opening, and the housing defines an entry. The opening operates to receive the retainer when the retainer is inserted through the entry. The housing includes a pair of clips that are disposed at, and define, the entry. The housing is divided by a first gap that is defined between one clip and the cap and by a second gap that is defined between the other clip and the cap. The gaps enable the clips to flex relative to the cap to allow insertion of the retainer through the entry and into the cap.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description.

Figure 1:
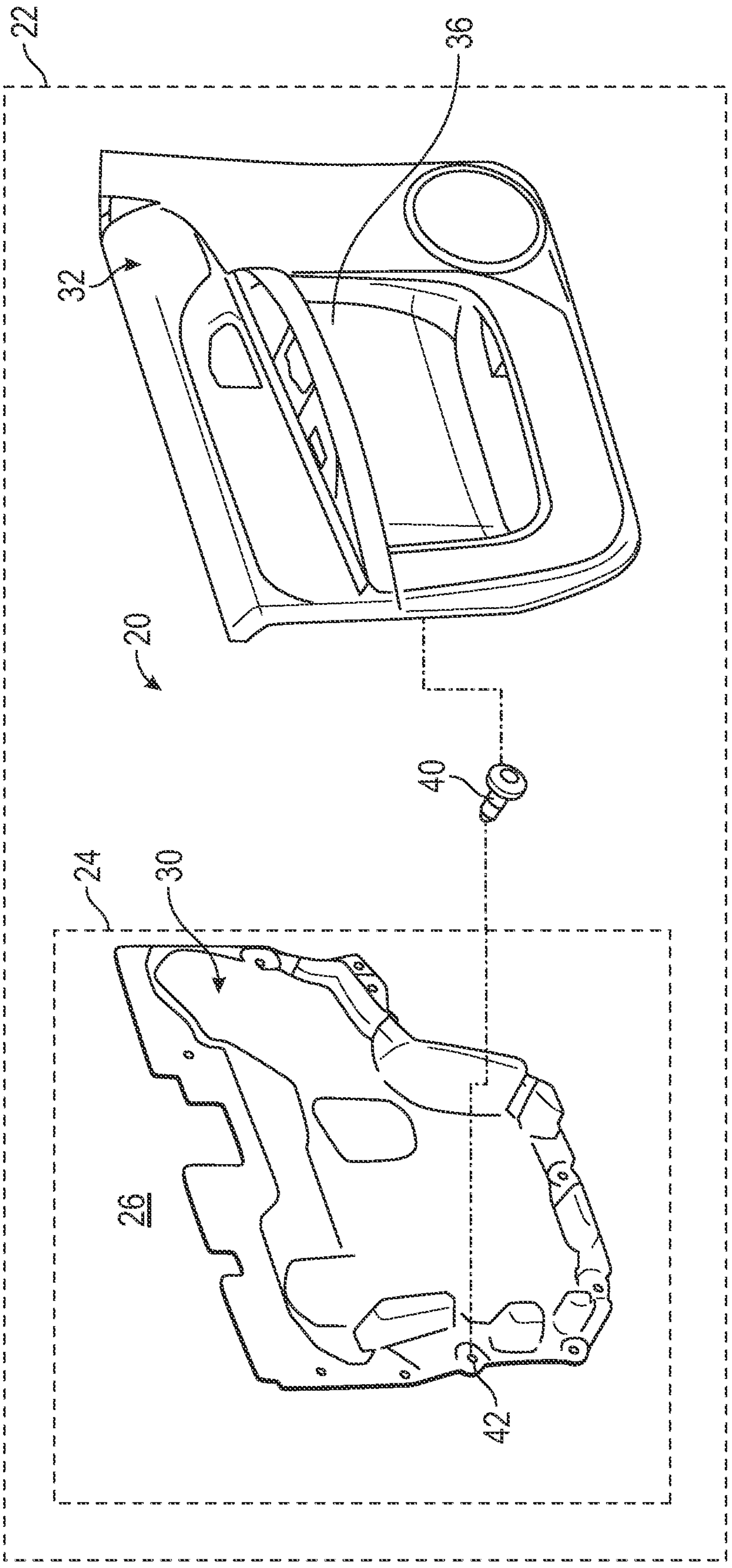
FIG. 1 is a schematic diagram of a vehicle with a component retainer system, in accordance with various embodiments.

With reference to FIG. 1, illustrated is one example of a retaining system 20 in the context of a vehicle 22 having a body 24. As depicted in FIG. 1, the body 24 of the vehicle 22 may be supported on wheel assemblies (not shown), such as by a suspension assembly (not shown). The body 24 may be of various types that define a physical shape for desired purposes. The body 24 substantially encloses components of the vehicle 22, defines exterior surfaces, and defines an interior 26. The wheel assemblies may each be rotationally coupled near a respective corner of the body 24. In various embodiments, the vehicle 22 may be a front wheel drive vehicle, a rear wheel drive vehicle, or an all-wheel drive vehicle with any number of wheels, however other drive arrangements are contemplated.

Propulsion of the vehicle 22, such as on a roadway, may be provided by a propulsion system (not shown). The propulsion system may be any of various types such as electric, internal combustion, hybrid, or others. Torque generated by the propulsion system is transferred to the wheel assemblies to propel the vehicle 22, which may be done under manual and/or autonomous control.

In the embodiment illustrated in FIG. 1, the interior 26 of the vehicle 22 includes a base component 30, which in this embodiment is an interior structural panel of a door of the vehicle 22. A trim component 32 is configured to cover the base component 30 and to face the interior 26 of the vehicle 22. The base component 30 may be a door panel as shown, a trunk panel, a roof panel, or any other component, including in non-vehicular applications, to which the trim component 32 may be attached. The trim component 32 may be, without limitation, an interior trim panel for a door as shown, a trunk trim panel, a roof trim panel, or any other component, including in non-vehicular applications, for connection with the base component 30.

In the assembly of articles, one of the challenges in efficiently connecting together of components may involve connecting a part, such as the trim component 32 to another component, such as the base component 30, where the fasteners are invisible from the outer surface 36 of the assembled trim component 32. According to a number of variations described in relation to FIG. 1, the trim component 32 may be connected to the base component 30 by a number of retainers, represented by the retainer 40. The retainer 40 of the retaining system 20 is connected with the trim component 32 as described below and is configured to engage the trim component 32 through one or more holes 42. Features and components shown in other figures may be incorporated and used with those shown in FIG. 1.

Figure 2:
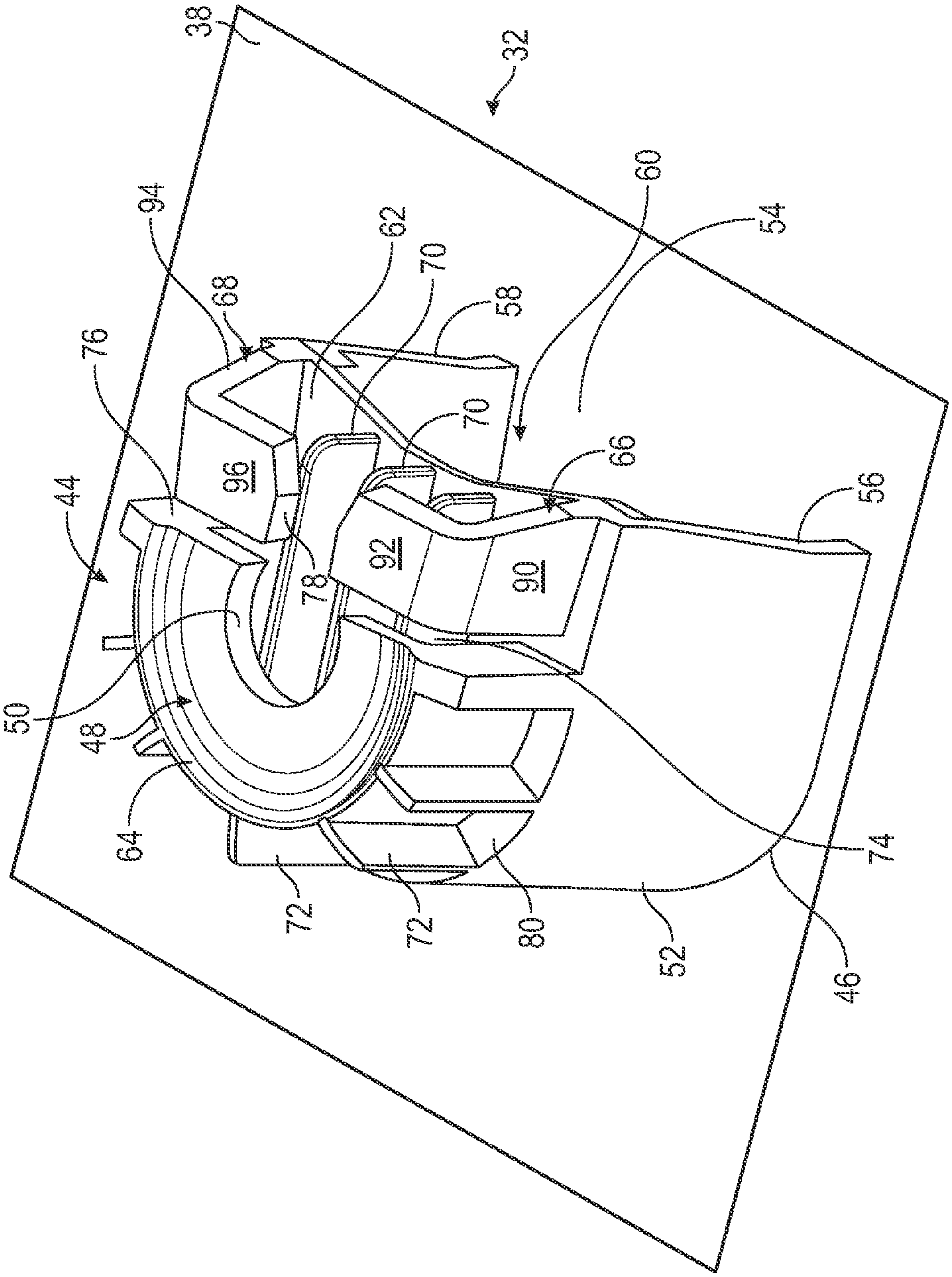
FIG. 2 is a perspective illustration of a housing for the retainer system of FIG. 1, in accordance with various embodiments.
Figure 3:
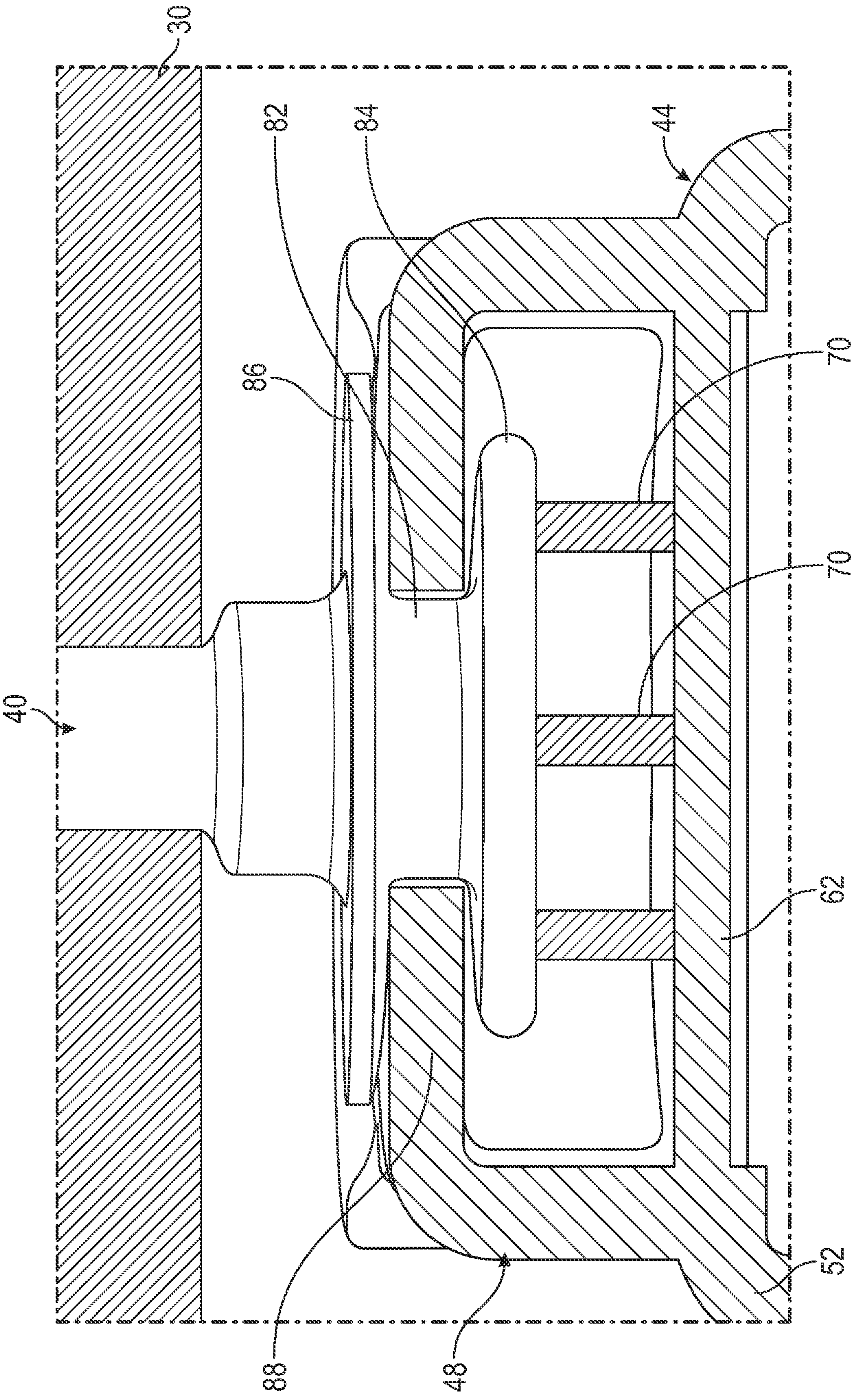
FIG. 3 is a schematic, sectioned illustration of part of the retainer system of FIG. 1 with a retainer in the housing, in accordance with various embodiments.

Referring to FIGS. 2 and 3 along with FIG. 1, the back surface 38 of the trim component 32, which is a side opposite the outer surface 36, includes a number of housings, represented by the housing 44. The housing 44 is configured to receive and hold the retainer 40, such as shown in FIG. 3. The housing 44 is constructed to provide strength for securely holding the retainer 40, while also having compliance to be receptive to releasably receiving the retainer 40. The housing 44 may be referred to as a "dog-house" due to its shape and appearance. The housing 44 provides a number of functions including as a convenient structure to releasably connect with the retainer 40 and to locate the retainer 40 at a projected location from the back surface 38 of the trim component 32.

The housing 44 may include a base 46 that is connected to the trim component 32 at the back surface 38 and extends away from the back surface 38 to a receiver 48. The receiver 48 is presented a distance away from the back surface 38 and includes an opening 50 for receiving and holding the retainer 40. The receiver 48 is connected with, and is supported on the trim component 32 by, a wall 52. The wall 52 forms the base 46 and as such is connected with the trim component 32. The wall 52 has an open side 54. In the current embodiment, the wall 52 is curved around the area between the receiver 48 and the back surface 38 from an edge 56 to another edge 58. In other embodiments, the wall 52 may take another shape such as semi-cubic, angled, and others. The open side 54 is bounded by the edges 56, 58, the receiver 48 and the back surface 38. The space 60 inside the wall 52 is substantially open.

In general, the receiver 48 includes a platform 62, a cap 64, at least one clip (clips 66 and 68), supports 70 and ribs 72. The receiver 48 defines the opening 50, gaps 74, 76 and an entry 78. The platform 62 is wall-like and is joined with the wall 52 at its end 80 opposite the base 46 and defines a side of the space 60. The supports 70 extend from the platform 62 and act as slides/ramps for guiding the retainer 40 into the opening 50. The supports 70 also work to provide support during assembly of the door trim component 32 to the sheet metal of the base component 30. When the trim component 32 is pushed to the base component 30, the pin and grommet (retainer 40) needs a support underneath to help it to be push inside the hole 42. In the current embodiment, there are three supports 70 although any number may be used. The cap 64 may be flat or may have the retainer's shape depending on the design intent, and in embodiments may be shaped to conform to the shape of the retainer 40 and to capture the retainer 40 by the receiver 48. As shown in FIG. 3, the opening 50 receives a shaft 82 of the retainer 40 and the cap 64 contains a head 84 of the retainer 40. As such, the retainer 40 is held by the housing 44. A flange 86 is provided on the shaft 82 with a wall 88 of the cap 64 of the housing 44 of the trim component 32 captured between the head 84 and the flange 86. The ribs 72 are provided around the outside of the receiver 48 for added strength and may be sized, shaped and located as needed. The ribbing is optional and in some cases the housing 44 doesn't need the ribbing, therefore, in embodiments the ribs 72 may not be provided for the housing 44.

The clips 66 and 68 are disposed on the same side of the housing 44 as the open side 54. The clips 66 and 68 define the entry 78 which is aligned with, and leads to, the opening 50. In some embodiments, only one clip 66, or 68 may be used. For example, only the clip 66 may be present with the cap 64 extending on the other side of the opening 78 where the clip 68 is absent. The gap 74 is defined between the clip 66 and the cap 64. The clip 66 has a leg 90 that extends from the platform 62 and a leg 92 that extends toward the clip 68. Similarly, the gap 76 is defined between the clip 68 and the cap 64. The clip 68 has a leg 94 that extends from the platform 62 and a leg 96 that extends toward the clip 66. The entry 78 is defined between the legs 94 and 96. The clips 66 and 68 have an angled shape and are cantilevered from the platform 62 so that they may flex under force with the legs 92 and 96 moving at various angles to vary the size/width of the entry 78 for insertion and/or removal of the retainer 40 form the receiver 48. In embodiments, the width of each clip 66, 68 closer to the platform 62 may be larger than the width near the legs 92, 96. The shape could be angled but also straight or with any shape as long it allows the clips 66, 68 to bend. The gaps 74 and 76 create a "divided" structure of the receiver 48 where the cap 64 provides retaining strength and the clips 66 and 68 provide a tunable way of receiving and maintaining the retainer 40 in the opening 50 for ergonomics and effectiveness. The amount of force needed to insert the retainer 40 may be adjusted by the design of the clips 66 and 68 including by the selection of material used, their thickness and width, and their structural features such as ribs and contours.

Figure 4:
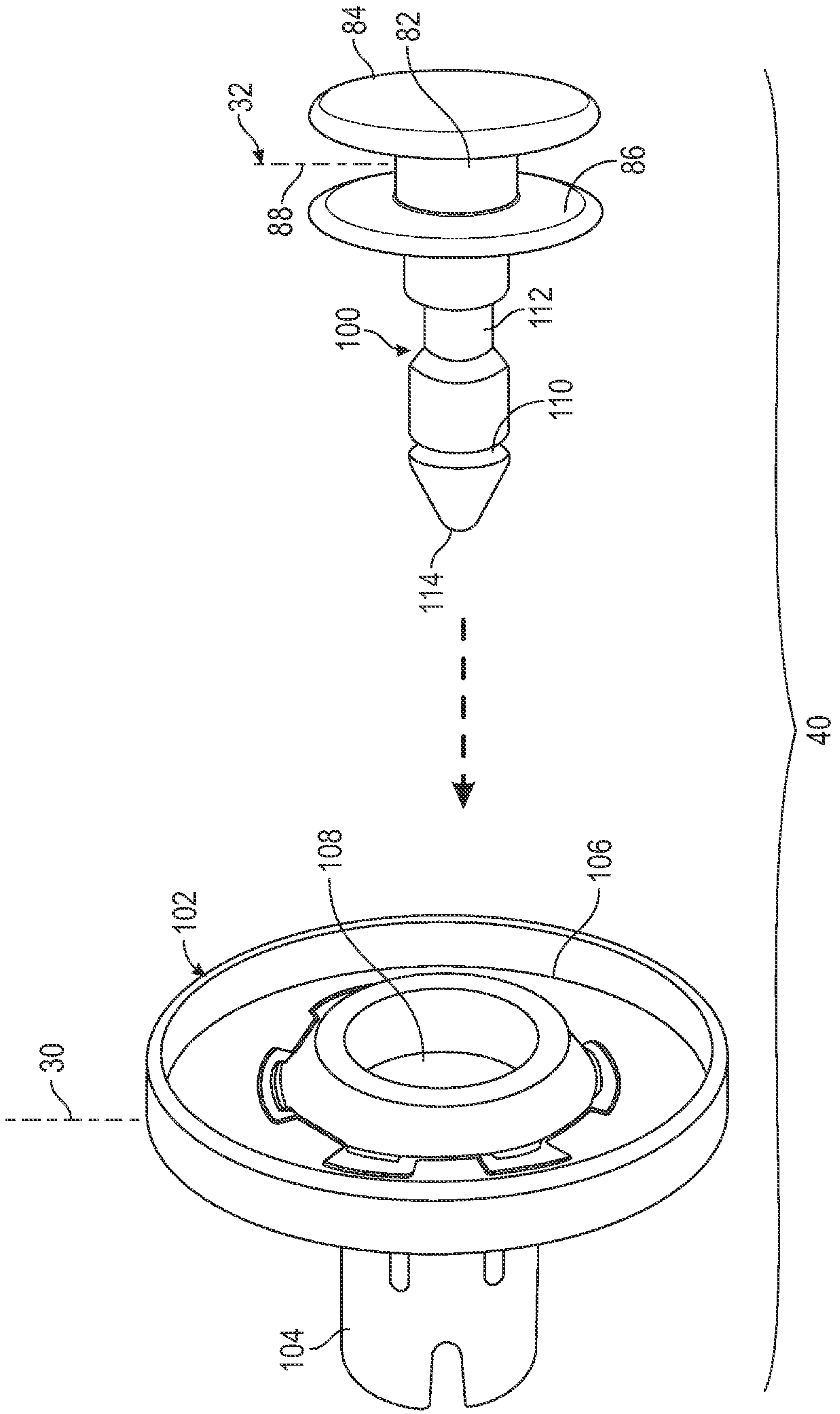
FIG. 4 is a schematic diagram of a retainer of the retainer system of FIG. 1 with a pin and grommet, in accordance with various embodiments.

Referring to FIG. 4, details of an embodiment of the retainer 40 are shown. In this embodiment, the retainer 40 is a pin-and-grommet type. In other embodiments, the retainer may be another type such as threaded, push-in (e.g. tree or bird-beak shaped), or others, with or without a grommet. As illustrated, the retainer 40 includes a pin 100 and a grommet 102. The pin 100 is configured for retention in the housing 44 of the trim component 32 and the grommet 102 is configured for retention in the hole 42 of the base component 30. The grommet 102 includes a plug 104 for insertion into the hole 42 and a flange 106 at one end of the plug 104. A through-hole 108 is formed through the flange 106 and the plug 104 for receiving the pin 100. The pin 100 includes the shaft 82, the head 84 and the flange 86. The shaft 82 extends from the opposite side of the flange 86 from the head 84 to a tip 114 for insertion into the grommet 102. Between the flange 86 and the tip 114, the shaft 82 includes a ridge 110 and a narrowed section 112 for clipping into the grommet 102. During assembly, the pin 100 is inserted into the housing 44 with the tip 114 projecting away from the back surface 38 of the trim component 32 and the grommet 102 is inserted into the hole 42 of the base component 30. With the pin 100 held by the housing 44, the tip 114 is inserted into the through hole 108 and the trim component 32 is retained on the base component 30. In other embodiments, the housing 44 may be on the base component 30 and the retainer 40 may held thereon, and the grommet 102 or hole 42 may be on the trim component 32.

Figure 5:
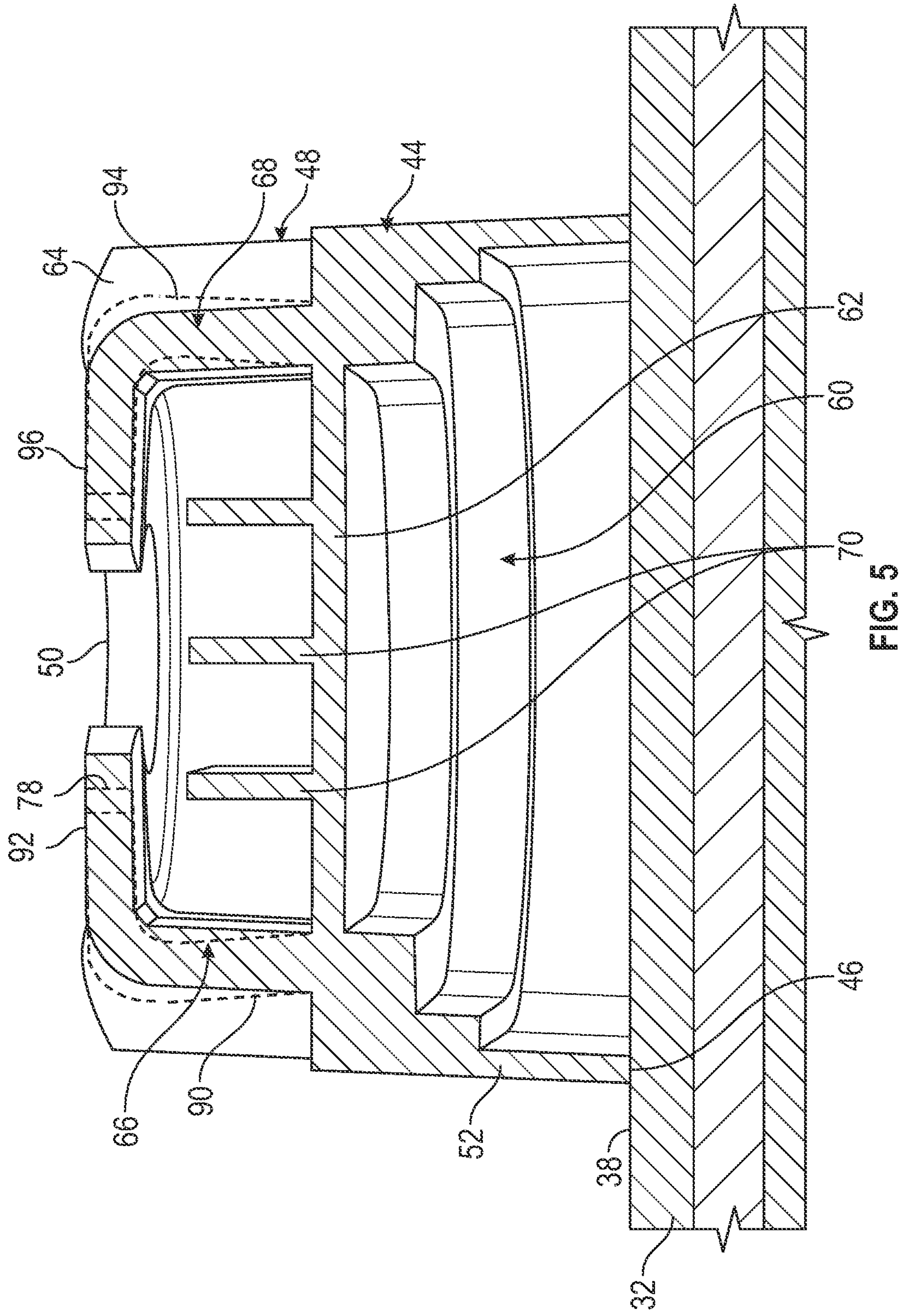
FIG. 5 is a schematic illustration of the housing of the retainer system of FIG. 1 illustrating compliance action, in accordance with various embodiments.
Figure 6:
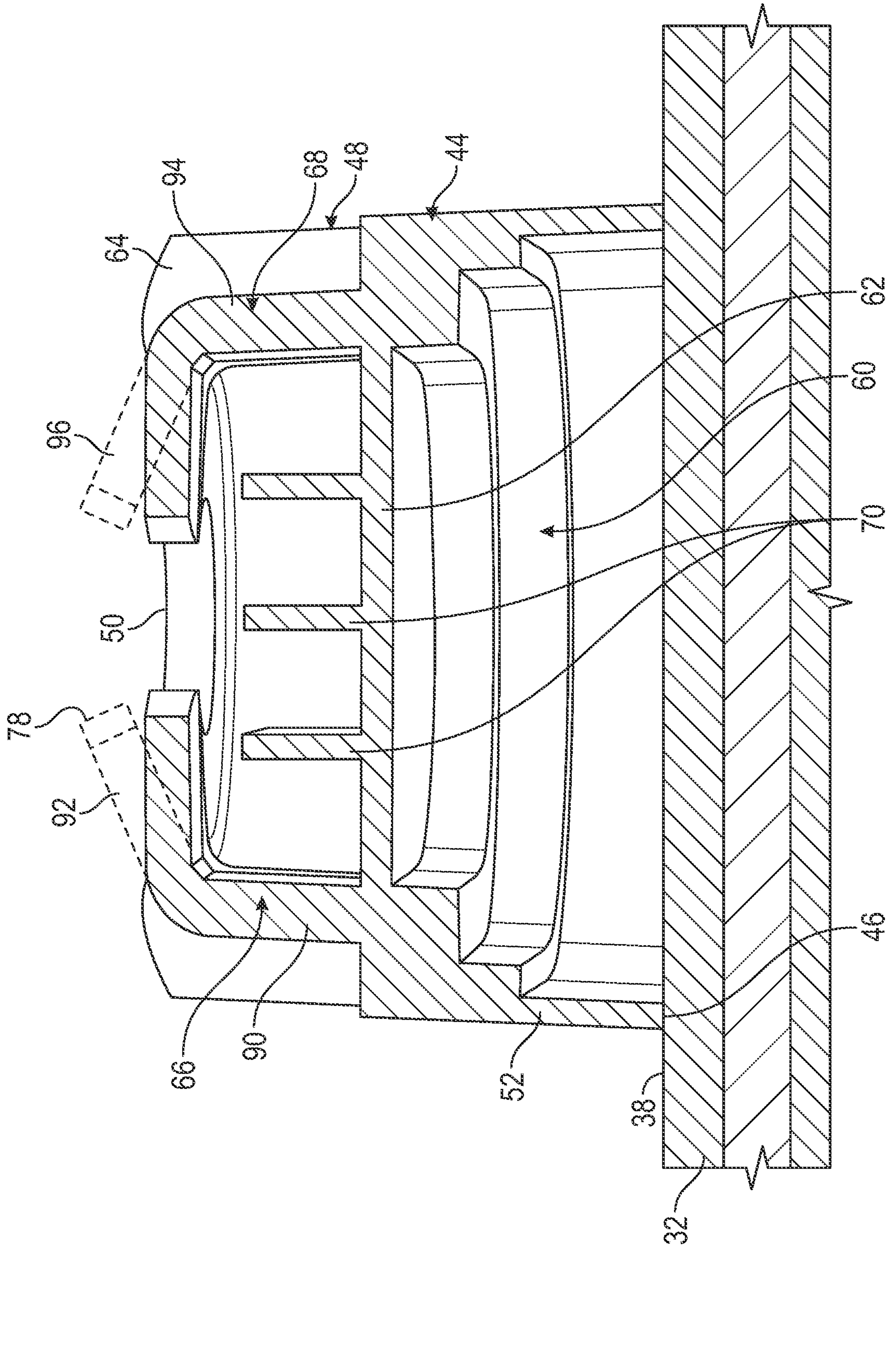
FIG. 6 is a schematic illustration of the housing of the retainer system of FIG. 1 illustrating another compliance action, in accordance with various embodiments.

Referring to FIG. 5, the action of the clips 66, 68 is schematically illustrated. The clips 66, 68 are shown in their relaxed state in solid-line form and in their flexed state in dashed-line form. In the relaxed state, the distance between the supports 70 and the clips 66, 68 creates and interference to hold the retainer 40 in the opening 50. In their flexed state, the size/width of the entry 78 is increased as compared to the relaxed state so that the shaft 82 of the retainer 40 fits through. The clips 66, 68 move with the legs 92, 96 moving line-to-line and the legs 90, 94 bending at angles as depicted. Once the shaft 82 positioned in the opening 50, the clips 66, 68 return to the relaxed state and the retainer 40 is captured in the housing 44. The profile shape of the clips 66, 68 may take a variety of forms such as curved, angled, multiple angled, or a combination thereof. In an alternative embodiment of FIG. 6, the legs 92, 96 may bend as shown in dashed line form to increase the size of the entry 78.

Figure 7:
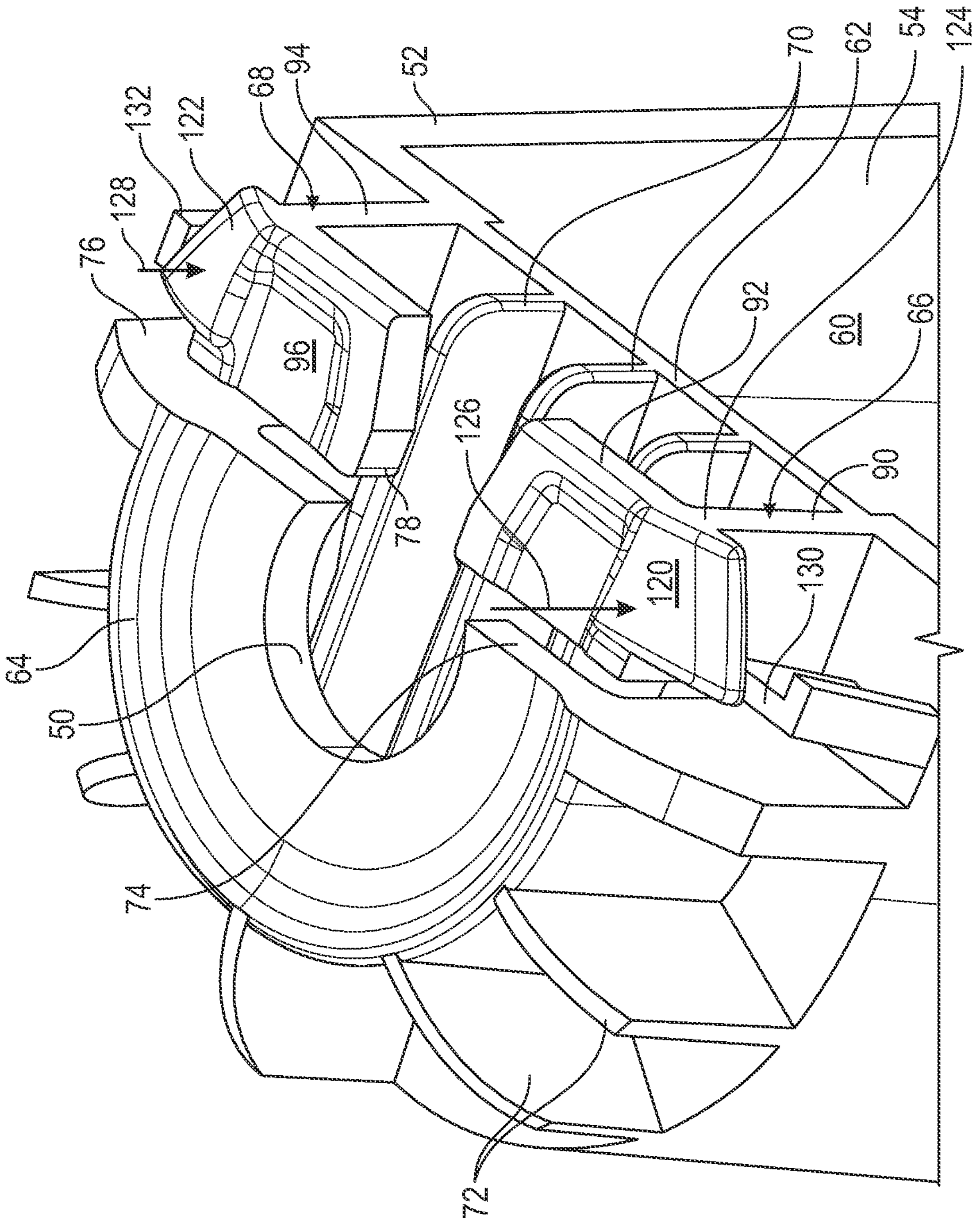
FIG. 7 is a perspective illustration of a housing for the retainer system of FIG. 1, in accordance with various embodiments.

Referring to FIG. 7, and embodiment of the housing 44 includes release tabs 120, 122 on the clips 66, 68. The release tab 120 projects from the clip 66 at a junction 124 between the leg 90 and the leg 92. The release tab 120 projects from the junction 124 in an opposite direction from the leg 92. As a result, a force 126 on the release tab 120 flexes the clip 66 so that the leg 92 moves laterally as the leg 90 bends. Similarly, a force 128 on the release tab 122 flexes the clip 68 so that the leg 96 moves laterally as the leg 94 bends. As a result, the tabs 120, 122, via the forces 126, 128, may be used to flex the clips 66, 68 increasing the size/width of the entry 78. This action may be used to remove the retainer 40 from the housing 44 and may also be used to insert the retainer 40 into the housing 44 in an ergonomically friendly manner. The housing 44 also includes stops 130, 132 which are positioned between the tabs 120, 122 and the platform 62. The stops 130, 132 extend from the platform 62 toward the release tabs 120, 122, and act to limit travel of the tabs 120, 122 under the forces 126, 128 to ensure the clips 66, 68 remain in their elastic range and to avoid plastic deformation or fracture of the clips 66, 68.

Figure 8:
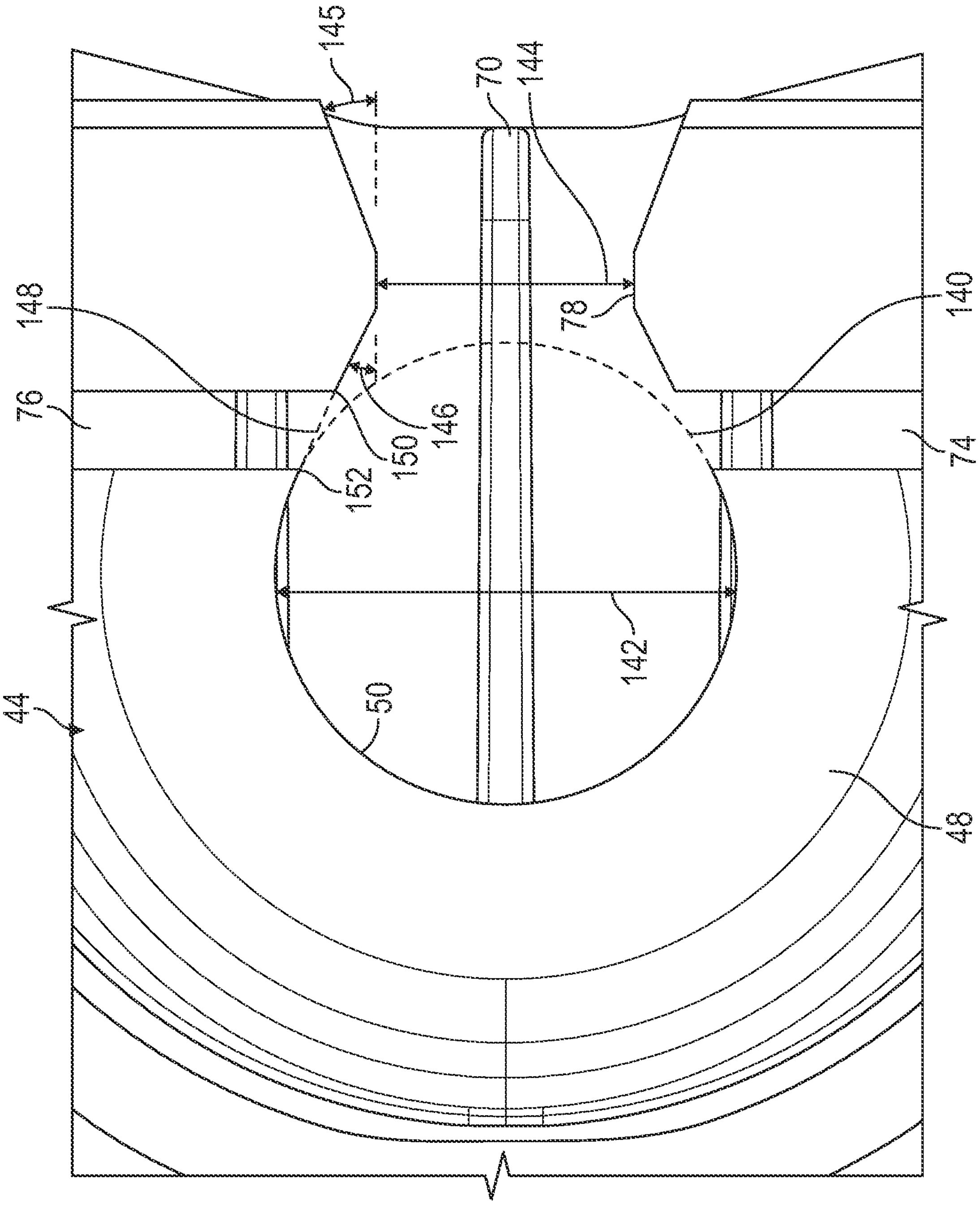
FIG. 8 is a plan view of a housing for the retainer system of FIG. 1, in accordance with various embodiments.

Referring to FIG. 8, details of the receiver 48 of the housing 44 are shown. The outline 140 of the shaft 82 is shown as a reference size that is approximately the same as the diameter 142 of the opening 50 but smaller while still closely fitting within the opening 50 without substantial clearance. In embodiments, the opening 50 may be larger with a clearance given between the diameters per design intent. Notable is that the outline 140 of the shaft 82, when seated in the opening 50, is inboard from the clips 66, 68. The entry 78 has a width 144 that is smaller than the outline 140 of the shaft 82 so that the clips 66, 68 hold the retainer 40 in the opening 50 when in their relaxed states. The clips 66, 68 have a feature at the outboard side (entrance) of the entry 78 to facilitate insertion of the retainer 40. The feature is an angled configuration that tapers from its widest at the outboard side and narrows moving inward toward the opening 50. In embodiments, the angle 145 is preferably between 15 and 30 degrees. The clips 66, 68 have a feature at the inboard side (exit) of the entry 78 tailored to provide a desired amount of retention of the retainer 40 in the housing 44 and to provide an ergonomically friendly extraction of the retainer 40 from the housing 44. In embodiments to maximize retention, the angle 146 may be ninety degrees. In embodiments where ease of extraction is desired, the angle 146 may be an acute angle. In embodiments, the angle 146 may be selected so that a projecting line 148 extends from the corner 150 of the clip 68 to the corner 152 of the cap 64 at the opening 50. This geometry avoids binding when insertion and/or extraction of the retainer 40 is undertaken.

Figure 9:
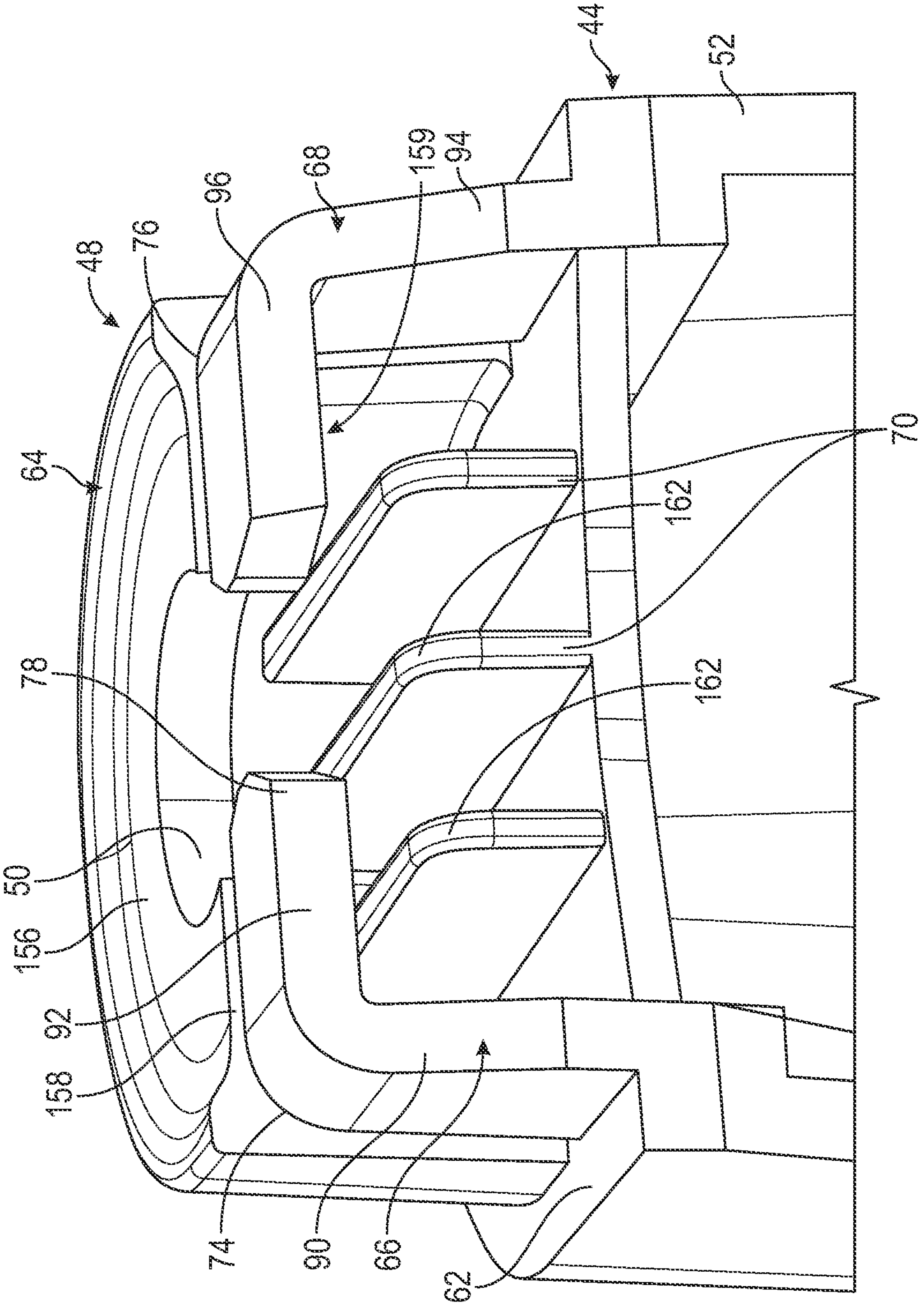
FIG. 9 is a perspective illustration of a housing for the retainer system of FIG. 1, in accordance with various embodiments.

Referring to FIG. 9, a perspective illustration of the housing 44 shows features of the receiver 48. The legs 92, 94 are positioned at the same height from the platform 62 and the supports 70 as the cover of the cap 64. In some embodiments, the legs 92, 94 may be positioned closer to the platform 62 and to the supports 70 than the cover 156 of the cap 64. The result, in such an embodiment, is a step at area 158 across the gaps 74, 76 and an increased action of the clips 66, 68 to retain the retainer 40 in the housing 44. The supports 70 have smoothly rounded corners 162 to guide the head 84 of the retainer 40 into the receiver 48 through the slot 159. The shape of the corners 162 may be rounded as shown, or angled to provide a ramp-like structure that helps flex the clips 66, 68 as the retainer 40 is inserted.

Figure 10:
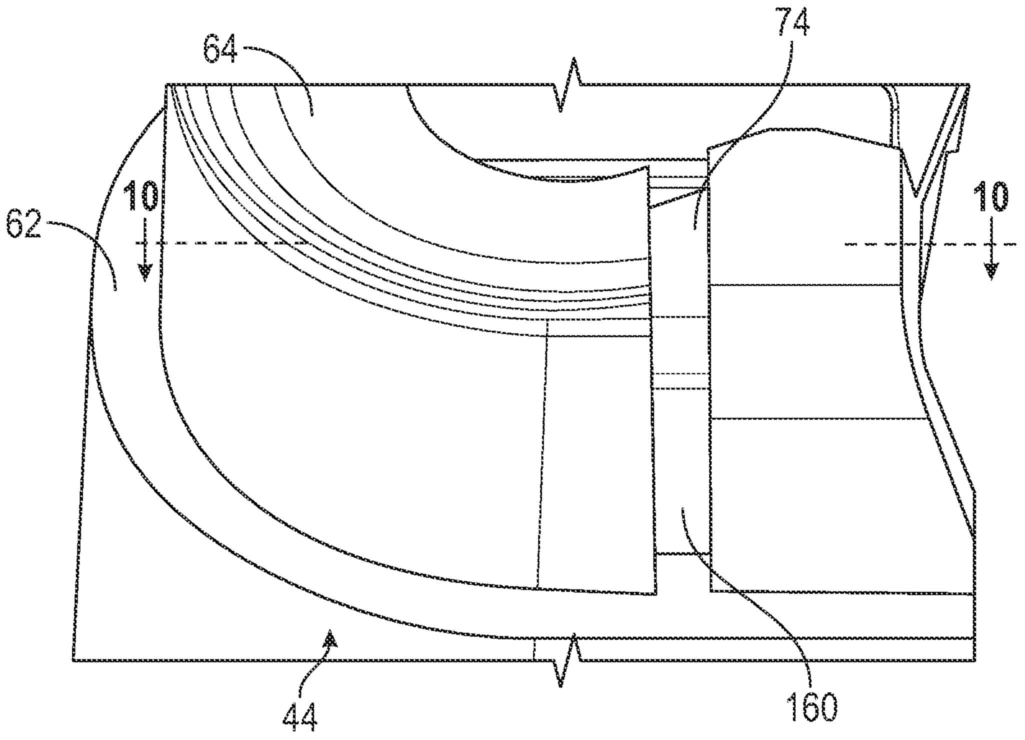
FIG. 10 is a fragmentary, perspective illustration of a housing for the retainer system of FIG. 1 showing an element of a mold, in accordance with various embodiments.
Figure 11:
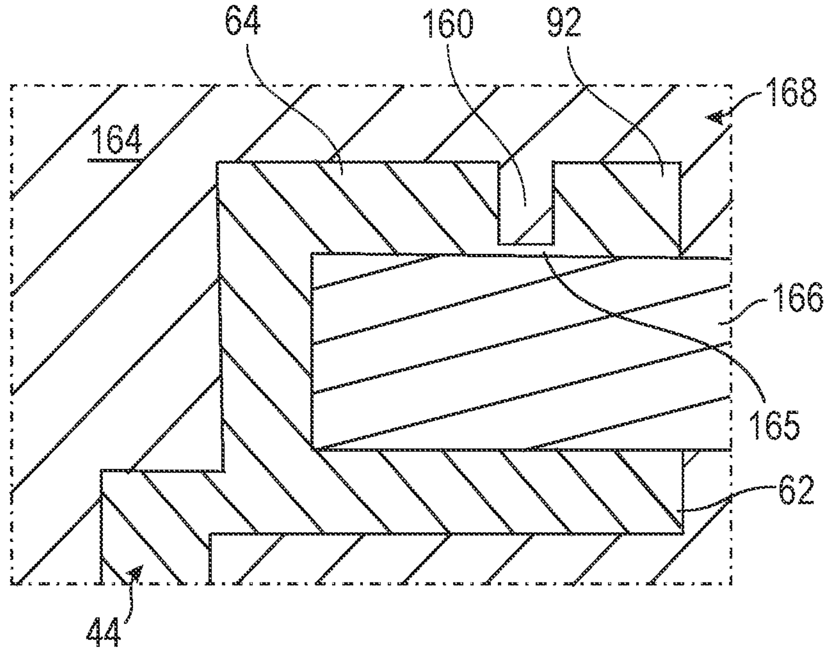
FIG. 11 is a fragmentary, sectional illustration of a housing and molding die for the retainer system of FIG. 1, in accordance with various embodiments.

As shown in FIGS. 10 and 11, when the housing 44 is formed, such as by injection molding, or another process, a mold, die, form or other forming device 168 may be used. The forming device 168 may have die elements that may include a core 164 and a lifter 166, which is a moveable part. There may be a parting line between the core 164 and the lifter 166 at the gaps 74, 76. A section 160 may be used at the part of the forming device 168 that forms the gaps 74, 76 (gap 74 illustrated). The section 160 may be a part of the core 164 that leaves a membrane 165 at the parting line. For example, the section 160 may be configured to leave a thin wall, for example a 0.5 mm wall thickness, which may be referred to as the membrane 165. The section 160 may be disposed in the forming device 168 and may avoid metal-to-metal contact of sections of the forming device 168 that create the gaps 74, 76 at the parting line. The section 160 facilitates forming the geometry of the housing 44. After forming, the membrane 165 may flex or tear in service, or be removed from the housing 44.

Accordingly, a retaining system with a divided housing is provided to enable secure retention of two components together with a retainer that is selectively added or removed from one of the components that carries the housing. The retaining system may be used in blind assembly where the retainers are hidden behind one of the components as it is assembled to the other component.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A retaining system comprising:

a first component having a hole;

a second component having a housing that includes a platform; and a retainer configured to engage with the housing of the second component and with the first component at the hole, wherein the housing comprises a receiver having a cap defining an opening and the housing defining an entry, wherein the opening is configured to receive the retainer when the retainer is inserted through the entry, wherein a clip is disposed at the entry, the clip being configured to flex to allow insertion of the retainer through the entry, wherein the clip includes a tab configured to flex the clip when a force is applied to the tab toward the platform, wherein the housing is divided by a gap that is defined between the clip and the cap, wherein a stop extends from the platform toward the tab, the stop configured to limit flexure of the clip to an amount within an elastic range.

2. The retaining system of claim 1, wherein:

the receiver is disposed at a distance from a surface of the second component and connected to the surface of the second component by a wall, and the receiver is configured to receive and hold the retainer.

3. The retaining system of claim 1, wherein:

the clip is one of a pair of clips, wherein the pair of clips define the entry, the opening has a diameter and the entry has a width, and the diameter is larger than the width when the pair of clips are in a relaxed state.

4. The retaining system of claim 1, wherein:
the clip comprises one of a pair of clips,
the pair of clips define the entry,
the opening has a diameter, and the entry has a width, and
the diameter is larger than the width when the pair of clips are in a relaxed state.

5. The retaining system of claim 1, wherein:
the retainer includes a shaft, a head and a flange,
supports extend from the platform toward the cap,
the receiver defines a slot between the cap and the platform, and
the slot is configured to receive the head and the opening is configured to receive the shaft.

6. The retaining system of claim 1, wherein:
supports extend from the platform toward the cap, and
a plurality of ribs are formed on the cap for strength.

7. The retaining system of claim 1, wherein:
the clip includes a first leg extending from the platform and a second leg extending from the first leg, and
the second leg is positioned closer to the platform than a cover of the cap forming a step across the gap.

8. The retaining system of claim 1, wherein:
the clip includes a first leg extending from the platform and a second leg extending from the first leg, and
the tab extends from the clip at a junction between the first leg and the second leg.

9. The retaining system of claim 1, wherein the housing is configured to be
produced within a form that has a pair of die elements that part at the gap, and comprising a section disposed at the gap that is configured to leave a membrane on the housing.

10. The retaining system of claim 1, wherein the clip is configured to flex between
a relaxed state and a flexed state, wherein the housing is configured to receive the retainer when the clip is in the flexed state and is configured to hold the retainer in the housing when the clip is in the relaxed state.

11. A retaining system comprising:
a first component having a hole;
a second component having a housing; and
a retainer configured to engage with the housing of the second component and with the first component at the hole,
wherein the housing comprises a receiver having a cap defining an opening and the housing defining an entry,
wherein the opening is configured to receive the retainer when the retainer is inserted through the entry,
wherein a first clip and a second clip are disposed at the entry, the first clip and the second clip defining the entry and configured to flex to allow insertion of the retainer through the entry,
wherein the housing is divided by a gap that is defined between the first and second clips and the cap,
wherein the housing is configured to be produced within a form that has a pair of die elements that part at the gap, and comprising a section disposed at the gap that is configured to leave a membrane as a part of the housing.

12. The retaining system of claim 11, wherein:
the receiver is disposed at a distance from a surface of the second component and the receiver connected to the surface of the second component by a wall, and
the receiver is configured to receive and to releasably hold the retainer.

13. The retaining system of claim 11, wherein:
the first clip and the second clip define the entry,
the opening has a diameter that is substantially the same in size as a shaft of the retainer,
wherein the entry has a width, and
the diameter is larger than the width when the first and second clips are in a relaxed state.

14. The retaining system of claim 11, wherein:
the opening has a diameter, and the entry has a width between the first and second clips, and
the diameter is larger than the width when the first clip and the second clip are in a relaxed state.

15. The retaining system of claim 11, wherein:
the retainer includes a shaft, a head and a flange,
the housing includes a platform, with supports extending from the platform toward the cap,
the receiver defines a slot between the cap and the platform, and
the slot is configured to receive the head, the opening is configured to receive the shaft, and
the supports are configured to guide the head through the slot and to assist in flexing of the first and second clips.

16. The retaining system of claim 11, wherein:
the housing includes a platform, with supports extending from the platform toward the cap,
the supports are configured to support the retainer, and
a plurality of ribs are formed on the cap for strength.

17. The retaining system of claim 11, wherein:
the housing includes a platform,
the first and second clips include cantilevered legs, and
the first and second clips each include a tab extending opposite the respective cantilevered leg, the respective tab configured to effect flexing of the respective first and second clip when forces are applied to the tabs toward the platform.

18. The retaining system of claim 11, wherein:
the housing includes a platform,
the first clip includes a first tab and the second clip includes a second tab, the first and second clip configured to flex the respective first and second clip when a force is applied to the respective tab toward the platform, and
a stop extending from the platform toward each of the first and second tabs, the respective stop configured to limit flexure of the respective clip to an amount within an elastic range.

19. The retaining system of claim 11, wherein:
the first clip includes a first leg extending from a platform and a second leg extending from the first leg,
a tab extends from the first clip at a junction between the first leg and the second leg, and
the second leg is positioned closer to the platform than a cover of the cap, forming a step across the gap.

20. A retention system for a trim component of a vehicle, the retention system comprising:
a base component having a hole, wherein the base component comprises a panel of the vehicle;
a housing defined in the trim component, the housing including a platform; and
a retainer configured to engage with the housing of the trim component and with the base component at the hole,
wherein the housing comprises a receiver having a cap defining an opening, and the housing defining an entry,
wherein the opening is configured to receive the retainer when the retainer is inserted through the entry,
wherein the housing includes a first clip and a second clip that are disposed at, and define, the entry, wherein the first clip includes a first tab and the second clip each includes a second tab, the first configured to flex the first clip and the second tab configured to flex the second clip when a force is applied to the respective tab toward the platform, wherein the housing is divided by a first gap that is defined between the first clip and the cap and by a second gap that is defined between the second clip and the cap, and wherein the first gap and the second gap enable the first clip and the second clip to flex relative to the cap to allow insertion of the retainer through the entry and into the cap, wherein a first stop extends from the platform toward the first tab and a second stop extends from the platform toward the second tab, the first and second stops configured to limit flexure of the respective clip to an amount within an elastic range.

* * * * *